3,003,337
ABSORPTION REFRIGERATION
Wilhelm Georg Kogel, Stockholm, Sweden, assignor to Aktiebolaget Electrolux, Stockholm, Sweden, a corporation of Sweden
Filed Dec. 3, 1957, Ser. No. 700,340
Claims priority, application Sweden Jan. 5, 1957
8 Claims. (Cl. 62—496)

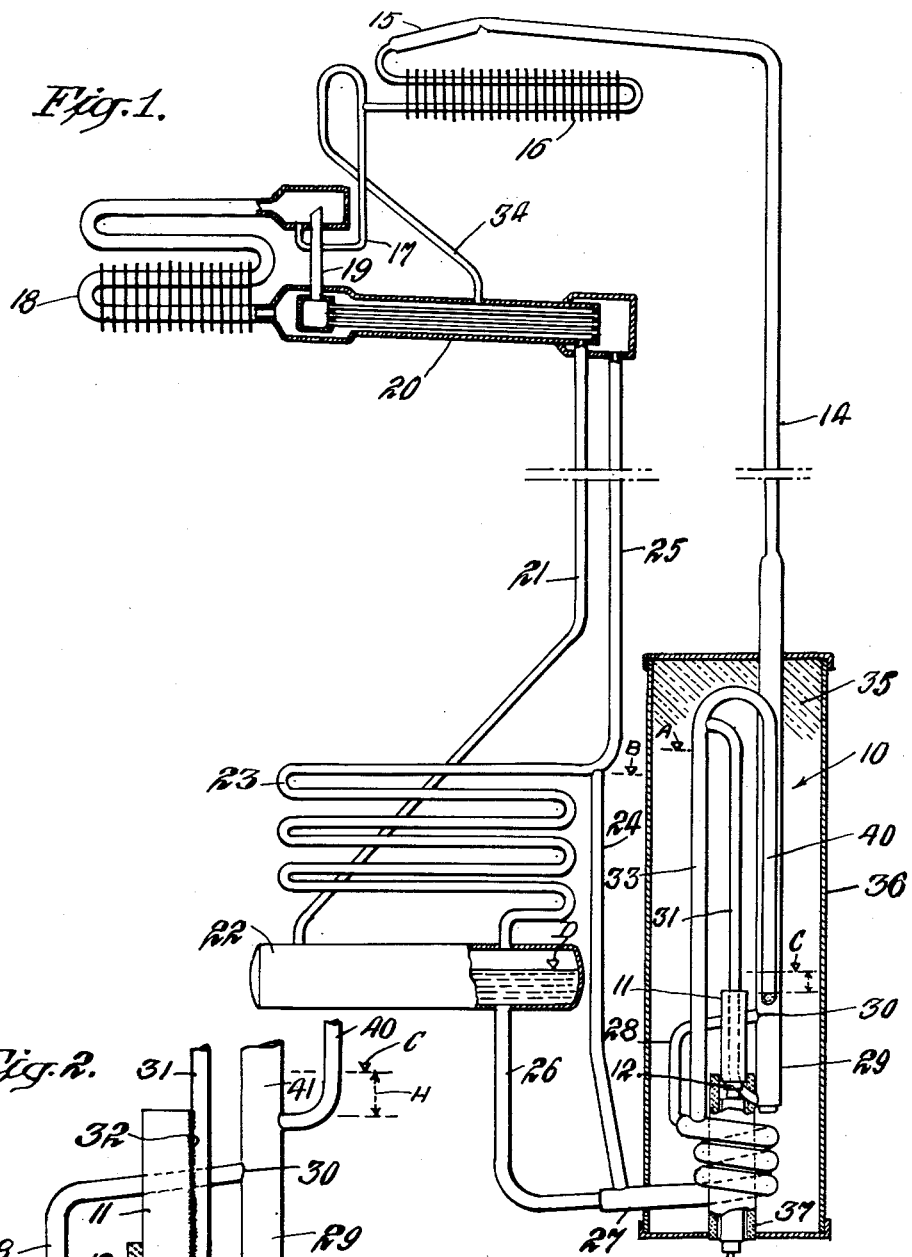
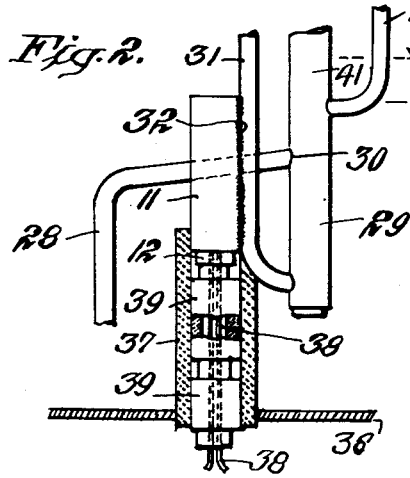

My invention relates to refrigeration systems of the absorption type and is especially useful in such systems which employ an inert gas or pressure equalizing agent.

An object of my invention is to provide an absorption refrigeration system of the inert gas type having improved operating characteristics.

Another object of my invention is to provide an absorption refrigeration system of this type in which the heat losses are materially reduced.

A further object of my invention is to provide in an absorption refrigeration system of this type an improvement whereby the expulsion of refrigerant vapor from absorption solution and the circulation of the solution and refrigerant vapor in the system are correlated so that a system having a given cooling capacity may be operated with less heat input.

A still further object of my invention is to provide in an absorption refrigeration system of this type an improvement whereby the rate at which absorption solution is circulated in its circuit is correlated to the rate at which refrigerant vapor is introduced into the condenser of the system.

The invention, together with the above and other objects and advantages thereof, will be more fully understood upon reference to the following description and accompanying drawing forming a part of this specification, of which:

FIG. 1 illustrates more or less diagrammatically a refrigeration system embodying the invention; and FIG. 2 is an enlarged fragmentary view, partly in section, of parts shown in FIG. 1 to illustrate details more clearly.

Referring to FIG. 1, I have shown my invention embodied in an absorption refrigeration system of a uniform pressure type in which an inert pressure equalizing gas is employed. A refrigeration system of this type comprises a vapor expulsion unit 10 containing a refrigerant, such as ammonia, in solution in a body of absorption liquid, such as water. Heat is supplied to the vapor expulsion unit 10 from a heating tube 11 in a manner to be described presently. The heating tube 11 may be heated by an electrical heating element 12, for example, which is disposed within the tube.

The heat supplied to the vapor expulsion unit and absorption solution contained therein expels refrigerant vapor out of solution, and, in a manner which will be described hereinafter, the refrigerant vapor passes upwardly from the vapor expulsion unit 10 through a vapor supply line or conduit 14 and an air-cooled rectifier 15 into an air-cooled condenser 16 in which it is condensed and liquefied. Liquid refrigerant flows from condenser 16 through a conduit 17 into a cooling element 18 in which it evaporates and diffuses into an inert pressure equalizing gas, such as hydrogen, which enters through a conduit 19. Due to evaporation of refrigerant fluid into inert gas in cooling element 18, a refrigerating effect is produced with consequent absorption of heat from the surroundings.

The rich gas mixture of refrigerant vapor and inert gas formed in cooling element 18 flows from the lower part thereof through one passage of a gas heat exchanger 20, a conduit 21 and an absorber vessel 22 into the lower end of an absorber coil 23. In absorber coil 23 the rich gas mixture flows counter-current to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage of gas heat exchanger 20 and conduit 19 into the upper part of cooling element 18.

The circulation of gas in the gas circuit just described is due to the difference in specific weight of the columns of gas rich and weak, respectively, in refrigerant vapor. Since the column of gas rich in refrigerant vapor and flowing from cooling element 18 to the absorber coil 23 is heavier than the gas weak in refrigerant and flowing from the absorber coil 23 to cooling element 18, a force is produced or developed within the system for causing circulation of inert gas in the manner described.

Absorption solution enriched in refrigerant flows from the absorber vessel 22 through a conduit 26, an inner passage of a liquid heat exchanger 27 and a connection 28 into a vertically extending pipe 29 at a point 30 which is at a level below the liquid surface level of the body of liquid held in the absorber vessel 22. The extreme lower end of pipe 29 is in communication with the lower end of a pump pipe or vapor lift tube 31 in thermal exchange relation with the heating tube 11 at 32, as by welding, for example. Liquid is raised by vapor-liquid lift action through tube 31 into the upper part of a standpipe 33.

The absorption liquid from which refrigerant vapor has been expelled flows from the level A in standpipe 33 through the outer passage of liquid heat exchanger 27 and conduit 24 to the level B into the upper part of absorber coil 23. The circulation of absorption solution in the liquid circuit just described is effected by raising of liquid through the pump pipe 31. The outlet end of condenser 16 is connected by a conduit 34 to a part of the gas circuit, as to the outer passage of the gas heat exchanger 20, for example, so that any inert gas which may pass through the condenser 16 can flow to the gas circuit.

The vapor expulsion unit 10 in its entirety, together with a major portion of the liquid heat exchanger 27, are embedded in a body of insulating material 35 retained in a metal shell or casing 36 having an opening at the bottom thereof. The heating tube 11 is embedded in a part of the body of insulating material 35 which is intermediate the ends thereof and spaced from the top and bottom ends of the shell 36. The electrical heating element 12 is arranged to be positioned within the heating tube 11 through a hollow sleeve member 37 which is formed of suitable insulating material and extends from the bottom of the heating tube 11 to the bottom opening in the shell 36.

The electrical conductors 38 for the electrical heating element 12 extend through a pair of apertured insulating members 39 held in end-to-end relation in the hollow sleeve member 37. The heating tube 11 snugly receives the heating element 12 which may comprise a cartridge housing an electrical wire or the like having a relatively high resistance that generates heat when connected to a source of electrical energy.

In the operation of the refrigeration system of FIG. 1, vapor generated in the vapor lift pipe 31 flows from the upper end thereof through the upper part of standpipe 33 and a conduit 40 to a region 41 in pipe 29 which serves as an analyzer and is disposed below the liquid surface level C of the liquid column contained therein. Since the conduit 26, inner passage of liquid heat exchanger 27 and the connection 28 provide a path of flow for absorption solution which is always filled with liquid during operation of the system, the liquid level C in pipe 29 is essentially the same as the liquid level D in the absorber vessel 22.

The generated vapor usually is a mixture of refrigerant vapor and absorption liquid vapor; and, when ammonia and water are employed as the refrigerant and absorption liquid, for example, the generated vapor is usually a mixture of refrigerant vapor and water vapor. Due to the difference in boiling points of ammonia and water, the water vapor may be removed from ammonia by cooling the mixture to condense out the water. In FIG. 1 this is accomplished by forcing all of the generated vapor from the conduit 40 through the liquid column in the analyzer 41 by bubble action.

The absorption liquid introduced into the analyzer 41 is relatively rich in refrigerant and at a lower temperature than the generated vapor, and, in bubbling through the enriched solution, the water vapor is cooled sufficiently and condenses and in this way is removed from ammonia vapor. The latent heat of condensation resulting from condensation of water vapor is given up to the enriched absorption solution and forms an internally heated zone in which some ammonia vapor is expelled out of solution. Such expelled refrigerant mixes with refrigerant vapor generated in the vapor lift pipe 31, and the mixture passes from the analyzer 41 through the upper part of pipe 29 and conduit 14 to the condenser 16.

The part of the pump or lift pipe 31 in thermal exchange relation with the heating tube 11 may be referred to as the vapor-forming part, in which vapor bubbles are formed due to heat derived from the heating tube. Due to the formation of these vapor bubbles which tend to collect and become larger and larger, liquid in the lift pipe 31 becomes segregated, whereby slugs of liquid are caused to rise in the lift pipe by vapor lift action. Such vapor lift action of liquid is effected because the lift pipe 31 is of such size that vapor cannot freely pass liquid therein. Upward movement is imparted to liquid in the vapor lift pipe 31 under the influence of a "reaction head" formed by the liquid column maintained in pipe 29; that is, the weight of the column of liquid in pipe 29 overbalances the weight of the column of segregated liquid bodies and vapor in lift pipe 31 to cause rise of liquid in the latter.

In accordance with my invention, heat is supplied to the pump or lift pipe 31 by the heating tube 11 at an elevated temperature so that the ratio of the quantity of absorption solution raised in the pump to the quantity of refrigerant vapor expelled from solution in the pump is greater than 7, and the column of liquid in the analyzer 41 through which vapor bubbles therethrough is of such height that the ratio of the quantity of absorption solution raised in the pump to the quantity of refrigerant vapor introduced into the condenser 16 is less than 7.

In FIG. 1 heat is supplied by the heating tube 11 only to the pump or lift pipe 31 of the vapor expulsion unit 10, the conduit 29 and standpipe 33 being spaced and insulated from the heating tube 11. In this way, all of the heat for producing refrigeration is supplied to the refrigeration system through the pump or lift pipe 31. Accordingly, the heating tube 11 and pump or lift pipe 31 constitute the only parts of the vapor expulsion unit 10 which operate at relatively high temperatures and these parts can be given very small dimensions to reduce materially the heat losses from the vapor expulsion unit 10.

It will be seen in the preferred embodiment being described that in pump pipe 31 expulsion of refrigerant vapor is effected from absorption solution having a high concentration of refrigerant and of the same refrigerant concentration as absorption solution flowing from the absorber vessel 22. If the standpipe 33 were heat conductively connected to the heating tube 11 for the purpose of effecting vapor expulsion in standpipe 33 as well as in lift pipe 31, it would be necessary to heat the standpipe 33 to a higher elevated temperature than the lift pipe 31. This is so because absorption solution in the standpipe 33 has a lower refrigerant concentration than that in the lift pipe and a higher boiling temperature would be necessary in order for refrigerant vapor to be expelled therefrom. The vapor expulsion unit 10 can be operated at a lower temperature, therefore, when all of the refrigerant vapor is expelled from solution in the pump or lift pipe 31.

When all of the heat for operating the refrigeration system is supplied to the pump or lift pipe 31, the latter normally is heated to a sufficiently high temperature so that if the vapor generated in the pump pipe was to be introduced directly into the condenser 16, the partial vapor pressure of the absorption fluid would be unduly high and objectionable heat losses would occur. In order to avoid these heat losses, all of the vapor generated in the pump pipe 31 passes from the upper part of standpipe 33 and conduit 40 through the liquid column in the analyzer 41, as explained above. In bubbling through the enriched absorption solution in analyzer 41, the absorption liquid vapor is cooled and condenses and is removed from the refrigerant vapor, the latent heat of condensation being utilized to expel some refrigerant vapor from solution in the analyzer. Hence, a part of the heat employed to generate vapor in the pump pipe 31 is effectively utilized in the analyzer 41 in the form of heat of condensation to promote expulsion of refrigerant vapor in the vapor expulsion unit 10.

When all of the heat for operating the refrigeration system is supplied to the pump or lift pipe 31 only, rather than to both the pump pipe and another part of the absorption solution circuit, such as the standpipe 33, for example, a greater part of the generated vapor will be employed to raise liquid in the pump pipe 31, which will normally increase the rate at which absorption solution is circulated in its circuit. The rate at which absorption solution is circulated in its circuit desirably should be adequate to obtain proper absorption of refrigerant vapor from inert gas in the absorber. It has been determined that in order to reduce heat losses in a refrigeration system, however, the rate at which circulation of absorption solution is effected by the pump or vapor lift pipe should be properly related to the rate at which liquid refrigerant forms in the condenser and subsequently evaporates in the cooling element. If the circulation of absorption solution in its circuit is unduly high by heat being supplied only to the pump pipe 31 from the heating tube 11, heat losses which may eliminate the heat economies being sought will arise at the liquid heat exchanger and at other parts of the circuit.

If the heating tube 11 in FIG. 1 is employed to generate vapor in the standpipe 33 as well as in the pump or lift pipe 31, it being assumed the standpipe is heat conductively connected to the heating tube 11 in such a manner that about half of the refrigerant vapor is generated therein, in many instances the rate at which absorption solution will circulate in its circuit will be satisfactory and excessive heat losses will be avoided provided the ratio of the quantity of absorption solution circulated by the pump to the quantity of liquid refrigerant formed and passing from the condenser is about 7. In some instances a ratio as low as 4.5 will be satisfactory, especially when the refrigeration system is provided with an analyzer like the analyzer 41 in FIG. 1, for example. If this ratio should become too high and exceed 9, for example, unfavorable operating conditions will arise.

If it were to be assumed in the embodiment of FIG. 1 that the vapor generated in the pump 31 is introduced into condenser 16 without passing through the liquid column in analyzer 41, the losses in the vapor line or conduit 14 and absorption liquid circuit would be extremely high and the refrigeration system would not be practical. By flowing all of the generated vapor from the upper part of standpipe 33 and conduit 40 through the liquid column in the analyzer 41, however, two imporatnt advantages are realized. One of these advantages is that absorption liquid vapor present in the generated vapor is condensed in the liquid column in the analyzer 41 and the resulting heat of condensation is given up to enriched absorption solution and forms an internally heated zone in which refrigerant vapor is expelled out of solution. The second advantage is realized when, according to the invention, the column of liquid H in the analyzer 41 is of such height that the vapor pressure in the upper part of standpipe 33 increases sufficiently to reduce the rate at which liquid is raised by the pump pipe 31 so as to produce a desired relation between the quantity of liquid raised by the pump 31 and the quantity of liquid refrigerant formed in the condenser. This desired relationship is attained when the ratio of the quantity of absorption solution raised in the pump 31 to the quantity of refrigerant vapor expelled from solution in the pump is greater than 7, and the column of liquid in the analyzer 41 is of a height H so that the ratio of the quantity of absorption solution raised in the pump 31 to the quantity of refrigerant vapor introduced into the condenser 16 will be less than 7. By way of example and without limitation, the ratio of the quantity of absorption solution raised in the pump to the quantity of refrigerant vapor expelled from solution in the pump in some instances may be 9 kg. of solution to 1 kg. of refrigerant vapor, and the ratio of the quantity of absorption solution raised in the pump to the quantity of refrigerant vapor introduced into the condenser may be in the neighborhood of 4.5.

In a refrigeration system like that illustrated and described above which has been constructed according to the invention, enriched absorption solution flowing from the absorber vessel 22 to the pump 31 may have a refrigerant concentration of about 30%, and the absorption solution flowing from the standpipe 33 to the inlet of the absorber 23 may have a refrigerant concentration of about 20% after it has been raised in the pump and vapor expelled therefrom.

In the preferred embodiment illustrated, the electric heating element 12 extends within the heating tube 11 for the full length thereof, and it is to be noted that the heat conductive connection 32 between the pump or lift pipe 31 extends from the extreme top to the extreme bottom of the heating tube. The length of the electric heating element 12, therefore, is less than the height of the "reaction head" formed by the liquid column in pipe 29, under the influence of which liquid is raised by vapor lift action in the pump 31. The effective reaction head in FIG. 1 is represented by that portion of the liquid column in pipe 29 extending between the liquid surface level D in absorber vessel 22 (which is the same as the liquid surface level C in pipe 29) and the lowest point at which the pump or lift pipe 31 is heat conductively connected to the heating tube 11.

In some instances it may be desirable to employ a longer heating element or provide a longer heat conductive connection between the heating tube and the pump or lift pipe. However, the heating element or heat conductive connection to the pump or lift pipe preferably should not exceed the height of the "reaction head" by more than 10%. Stated another way, the vapor-forming part of the pump or lift pipe desirably should not exceed the effective reaction head, which is formed by the liquid column in pipe 29, by more than 10%. In the preferred embodiment illustrated and described above, the heat conductive connection 32 extends along a generatrix which is common to the heating tube 11 and the pump pipe 31.

In order to provide a vapor expulsion unit which is compact and small and requires a minimum quantity of insulation 35, the heating tube 11 and pump or lift pipe 31 are located so that the heat conductive connection 32 therebetween will be positioned above the highest point of the liquid heat exchanger 27 which is in the form of a helical coil and concentrically disposed about the axis of the heating tube. By supplying heat from heating tube 11 only to the pump or lift pipe 31, the upper parts of the standpipe 33 and conduit 40 will not be subjected to the elevated temperature at which the heating tube 11 is maintained. Also, the lower part of the standpipe 33 can be positioned a sufficient distance from the heating tube 11 and effectively insulated therefrom so that expulsion of vapor from solution therein is prevented. In a similar manner, the lower part of conduit 40 and the pipe 29 can be thermally shielded from the heating tube 11 without difficulty so that expulsion of vapor from solution in these parts, due to heat derived from the heating tube, is avoided.

While I have shown and described a single embodiment of my invention, it will be apparent that modifications and changes may be made without departing from the spirit and scope of the invention, as pointed out in the following claims.

What is claimed is:

1. The method of refrigerating with a system employing an inert gas which comprises circulating the gas through and between a place of evaporation and a place of absorption, circulating absorption solution through and between the place of absorption and place of vapor expulsion, heating solution to expel refrigerant vapor therefrom at the place of vapor expulsion which has an upwardly extending path in which solution is raised by vapor-liquid lift action for effecting said circulation of absorption solution, flowing the expelled vapor in intimate physical contact with a column of absorption solution which is enriched in refrigerant and at a lower temperature than the expelled vapor and is flowing from the place of absorption to the place of vapor expulsion, thereafter flowing the expelled vapor to a place of condensation for condensation therein and flowing the condensate to the place of evaporation for evaporation in the presence of the gas, said method further including applying heat at the place of vapor expulsion only to solution in the upwardly extending path to expel vapor therefrom for raising solution by vapor-liquid lift action, applying the heat at an elevated temperature to absorption solution in said path for the expelled vapor to reach a sufficiently high pressure to force its way through said column of absorption solution to analyze the vapor and thereafter flow therefrom to the place of condensation, controlling the composition of the analyzed vapor flowing to the place of condensation by said column of absorption solution, and also controlling the rate at which absorption solution is raised in said path by vapor-liquid lift action and hence the rate at which absorption solution is circulated through and between the place of absorption and place of vapor expulsion responsive to the pressure developed in a zone of the system which is influenced by said column of absorption solution and to which absorption solution is raised in said path by vapor-liquid lift action.

2. The method set forth in claim 1 wherein the heat applied only to the solution in the upwardly extending path is effective to expel vapor from absorption solution therein at such a temperature that the weight of the absorption solution raised in the path in a given interval of time will be at least seven times the weight of the vapor expelled from solution in the path, and, after the expelled vapor is forced through the column of absorption solution to analyze the vapor, the weight of the refrigerant vapor flowing to the place of condensation in said given interval of time will be increased to above one-seventh part of the weight of the absorption solution raised in said path.

3. The method set forth in claim 1 wherein the heat applied only to the solution in the upwardly extending path is effective to expel vapor from absorption solution therein at such a temperature that the weight of the absorption solution raised in said path in a given interval of time will be about nine times the weight of the vapor expelled from solution in the path, and, after the expelled vapor is forced through the column of absorption solution to analyze the vapor, the weight of the refrigerant vapor flowing to the place of condensation in said given interval of time will be about four and one-half times smaller than the weight of the absorption solution raised in said path.

4. The method set forth in claim 1 in which the concentration of refrigerant in the absorption solution flowing from the place of absorption to the place of vapor expulsion is about 30%, and wherein only the concentration of refrigerant in the raised absorption solution flowing from the upper end of said path in the place of vapor expulsion to the place of absorption will be about 20% responsive to the heat applied only to the solution in the upwardly extending path.

5. The method of refrigerating with a system employing an inert gas which comprises circulating the gas through and between a place of evaporation and a place of absorption, circulating absorption solution through and between the place of absorption and place of vapor expulsion which has an upwardly extending path which receives all of the absorption solution flowing from the place of absorption and in which solution is raised by vapor liquid lift action for effecting said circulation of absorption solution, heating solution at the place of vapor expulsion to expel refrigerant vapor therefrom, applying heat at the place of vapor expulsion only to solution in the upwardly extending path to expel refrigerant vapor therefrom for raising solution by vapor-liquid lift action, flowing all of the vapor formed in said path in intimate physical contact with a column of absorption solution which is enriched in refrigerant and at a lower temperature than the expelled refrigerant vapor and flowing from the place of absorption to the place of vapor expulsion, thereafter flowing the expelled vapor to a place of condensation for condensation therein, and flowing the condensate to the place of evaporation for evaporation in the presence of the gas, said method including applying the heat at an elevated temperature to absorption solution in said path for the expelled refrigerant vapor to reach a sufficiently high pressure to force its way through said column of absorption solution to analyze the vapor and thereafter flow therefrom to the place of condensation, determining the composition of the analyzed vapor flowing to the place of condensation responsive to said column of absorption solution, and also controlling the rate at which absorption solution is raised in said path by vapor-liquid lift action and hence the rate at which absorption solution is circulated through and between the place of absorption and place of vapor expulsion responsive to the pressure developed in a zone of the system which is influenced by said column of absorption solution and to which absorption solution is raised in said path by vapor-liquid lift action.

6. In an absorption refrigeration system of the inert gas type including a refrigerant vapor supply line, an absorber, a liquid heat exchanger, a vapor expulsion unit comprising an upright hollow tube, first and second vertically extending conduits, a lift pipe having a heat receiving part for raising liquid by vapor-liquid lift action, said lift pipe communicating with the lower part of said first conduit and the upper part of said second conduit, the aforesaid parts being so connected in the system that absorption solution flows in an unbroken stream from said absorber through said heat exchanger and said first conduit into the lower end of said lift pipe and forms a liquid column in said first conduit having a liquid surface level above the region solution is conducted thereto, and solution raised by said lift pipe forms a liquid column in said second conduit from which solution flows through said heat exchanger to said absorber, a third conduit for conducting vapor from the upper end of said lift pipe to said first conduit, said third conduit having one end thereof communicating with the upper part of said second conduit and the other end thereof communicating with said first conduit at a region below the liquid surface level of the liquid column maintained therein, the portion of the liquid column in said first conduit which extends downwardly from its liquid surface level to said region serving as an analyzer having a pressure head and through which vapor conducted through said third conduit is adapted to pass before flowing to said vapor supply line, the heat receiving part of said lift pipe being the only part of the system thermally connected to said hollow tube which is adapted to be heated to cause expulsion of vapor from solution in said lift pipe and raise liquid therein by vapor-liquid lift action under the influence of a reaction head formed by the liquid column in said first conduit, the major portion of the thermal connection of said lift pipe part to said tube being along a vertical height which is co-extensive with the reaction head, said first conduit being so constructed and arranged in the system that the liquid forming the column therein is heated to expel vapor therefrom only after such liquid flows from the lower part thereof into said lift pipe and reaches the heat receiving part thereof, and means operable to heat the interior of said hollow tube so that, during normal operation of the refrigeration system, a vapor pressure will be developed in said lift pipe which will exceed the pressure head at said region of the analyzer portion of the liquid column in said first conduit to which all vapor generated in the vapor expulsion unit is conducted through said third conduit to said first conduit.

7. An absorption refrigeration system as set forth in claim 6 in which said second conduit is thermally separated from said hollow upright tube.

8. An absorption refrigeration system as set forth in claim 7 in which the upper end of said upright hollow tube is at a first level substantially at the surface level of the liquid column in said first conduit and the lower end of said tube is at a second lower level substantially at the highest point of said heat exchanger.

References Cited in the file of this patent

UNITED STATES PATENTS

| | | |
|---|---|---|
| 2,210,613 | Anderson | Aug. 6, 1940 |
| 2,238,138 | Taylor | Apr. 15, 1941 |
| 2,504,784 | Ashby | Apr. 18, 1950 |
| 2,736,175 | Ostergren | Feb. 28, 1956 |
| 2,750,763 | Kogel | June 19, 1956 |
| 2,797,557 | Kogel | July 2, 1957 |